United States Patent
Sun et al.

(10) Patent No.: US 6,434,938 B1
(45) Date of Patent: Aug. 20, 2002

(54) CONTROL STRATEGY FOR TURBOCHARGED ENGINE HAVING VARIABLE VALVE ACTUATION APPARATUS

(75) Inventors: Jinhui Sun, Naperville; Xinqun Gui, Lisle; Terry G. Wood, Countryside; Steven T. Omachi, Niles, all of IL (US)

(73) Assignee: International Engine Intellectual Property Company, L.L.C., Warrenville, IL (US)

( * ) Notice: Subject to any disclaimer, the term of this patent is extended or adjusted under 35 U.S.C. 154(b) by 0 days.

(21) Appl. No.: 09/906,487

(22) Filed: Jul. 16, 2001

(51) Int. Cl.[7] .............................................. F02D 23/00
(52) U.S. Cl. ........................ 60/601; 60/611; 123/90.15
(58) Field of Search ........................... 60/601, 611, 602, 60/603, 600; 123/90.15

(56) References Cited

U.S. PATENT DOCUMENTS

| | | | |
|---|---|---|---|
| 3,568,435 A | * 3/1971 | May | 60/611 |
| 4,485,625 A | * 12/1984 | Fujimoto et al. | 60/601 |
| 5,133,310 A | * 7/1992 | Hitomi et al. | 123/90.15 |
| 5,187,935 A | * 2/1993 | Akiyama et al. | 60/601 |
| 6,055,948 A | * 5/2000 | Shiraishi et al. | 123/90.15 |
| 6,295,816 B1 | * 10/2001 | Gallagher et al. | 60/611 |
| 6,318,083 B1 | * 11/2001 | Machida et al. | 60/601 |
| 2001/0045194 A1 | * 11/2001 | Shiraishi et al. | 123/90.15 |

OTHER PUBLICATIONS

M. Capobianco and A. Gambarotta, "Variable Geometry and Waste–Gated Automotive Turbochargers: Measurements and Comparison of Turbine Performance," Journal of Engineering for Gas Turbines and Power, Jul. 1992, pp. 553–560, vol. 114.

* cited by examiner

Primary Examiner—Thomas Denion
Assistant Examiner—Thai-Ba Trieu
(74) Attorney, Agent, or Firm—Dennis Kelly Sullivan; Jeffrey P. Calfa; Neil T. Powell

(57) ABSTRACT

A turbocharger (32) creates intake manifold boost for a diesel engine (10). At times, exhaust valve opening is increasingly retarded in relation to the engine operating cycle to cause the turbocharger to increase boost, engine fueling is also increased in relation to the increased boost, and in response to any incipient surging of the compressor resulting from such increasingly retarded exhaust valve opening and such increased engine fueling, compressed charge air is bled from the intake manifold to counter the incipient surging and thereby avoid any significant turbocharger surge.

13 Claims, 6 Drawing Sheets

CONTROL STRATEGY FOR TURBOCHARGED ENGINE HAVING VARIABLE VALVE ACTUATION APPARATUS

FIELD OF THE INVENTION

This invention relates generally to turbocharged diesel engines that propel motor vehicles and are equipped with variable valve actuation, and in particular to a control strategy for increasing engine torque without undesirable consequences on tailpipe emissions, such as diesel engine exhaust smoke, especially at lower engine speeds where turbocharger boost is relatively low.

BACKGROUND AND SUMMARY OF THE INVENTION

A turbocharger is one type of device that is used to supercharge an internal combustion engine. A diesel engine that is supercharged by a turbocharger is sometimes referred to as a turbocharged diesel. A turbocharger comprises a turbine that is powered by engine exhaust gas and coupled by a shaft to operate a compressor that boosts pressure in the engine air intake system downstream of the compressor. Boost is controlled by controlling turbine operation.

A strategy for controlling turbine operation needs to consider the particular type of turbocharger. One type of turbocharger has a variable geometry, or variable nozzle, that is capable of changing the manner in which exhaust gas that flows through the turbocharger interacts with the turbine. Movable vanes are selectively positioned to control the nature of exhaust gas interaction with the turbine, and hence control boost. The turbocharger includes an electromechanical actuator for interfacing an electric control with the movable vanes. That actuator comprises a solenoid for setting vane position according to a control signal from the electric control. The control signal is developed according to a desired control strategy.

A waste-gate type turbocharger controls the proportion of exhaust gas that is allowed to interact with the turbine by controlling the extent to which a waste gate valve that diverts exhaust gas from the turbine is allowed to open. The waste gate valve may be operated by an electric actuator to which a control signal is applied.

It is believed fair to say that a turbocharger is generally considered to be a device for improving engine performance. A turbocharger is typically designed for higher engine speeds, because the amount of engine exhaust that is available to act on a turbine of a turbocharger at low engine speeds is usually insufficient for the turbocharger compressor to develop sufficient boost to render it effective in contributing to improved performance at those low speeds.

It has been discovered however that certain turbocharged diesel engines, especially engines that have variable valve timing, can develop increased low speed torque without undesirable consequences on tailpipe emissions, such as smoke in the engine exhaust. This improvement is achieved by certain conjunctive control of: 1) time at which the engine exhaust valves open during an engine operating cycle and 2) engine fueling. In general, the conjunctive control comprises retarding, i.e. delaying, the opening of the exhaust valves while increasing the fueling to maintain a desired air-fuel ratio in the combustion chambers. The improvement can provide a significant increase in engine torque during low speed operation of the engine without significant adverse effect on tailpipe emissions.

The process of exhausting products of combustion from a combustion chamber of a diesel engine may be considered to comprise two phases: 1) a blow-down phase where the exhaust gas pressure is large enough to induce exhaust gas flow through an open exhaust valve; and 2) a pump-out phase where the moving engine mechanism is reducing the swept volume of the combustion space to an extent that forces exhaust gases out through the open exhaust valve. The blow-down phase will commence immediately upon opening the exhaust valve while the pump-out phase will occur later. For example, if the exhaust valve for an engine cylinder is opened as a piston is completing a power downstroke within the cylinder in advance of the piston's arrival at bottom dead center (BDC), the blow-down phase will commence in advance of BDC. It may also continue into the ensuing exhaust upstroke of the piston until the pressure drops to an extent insufficient to induce continued exhaust flow or until the upstroking piston has reduced the swept volume sufficiently to create pressure that forces the exhaust gases out through the open exhaust valve. Testing has shown that retarding the timing of exhaust valve opening can create more effective exhaust blow-down that is beneficial to turbocharger operation, particularly at low engine speeds where a turbocharger may have heretofore been considered relatively ineffective in improving engine performance.

Because certain principles of the present invention include changing the time in the engine operating cycle when the exhaust valves open, the engine must have an appropriate mechanism for each exhaust valve. An example of such a mechanism comprises an electric actuator for opening and closing an exhaust valve in accordance with an electric signal applied to the actuator. Such an engine is sometimes referred to as a camless engine, particularly where the engine intake valves are also controlled by electric actuators. When the inventive strategy is invoked, the timing of the opening of each exhaust valve during the engine cycle is increasingly retarded.

By retarding exhaust valve opening, the in-cylinder burning time for particulates is increased, and this reduces particulate emission. Retarding the exhaust valve opening has also been discovered to provide increased energy input to the turbocharger compressor, thereby increasing boost, and it is believed that this discovery is a departure from presently prevailing knowledge. As boost increases and smoke decreases, engine fueling is also increased to develop increased engine torque so that the additional fueling is not adverse to tailpipe emissions in any significant way. In this way, the turbocharger is forced toward operating at its performance limit, thereby enabling the engine to develop a corresponding torque that is greater than the torque that would otherwise be achieved.

The consequence of retarding exhaust valve opening in conjunction with increasing engine fueling may however affect turbocharger operation. One possible consequence is undesirable surging of the turbocharger compressor that may occur should the exhaust flow acting on the turbine force the turbocharger to operate beyond its performance limit. In order to avoid such surging, a bleed valve at the compressor outlet operates at, or in anticipation of, incipient compressor surging to bleed compressed charge air from the intake system sufficiently to counteract, or prevent, the incipient surging. The compressed charge air is bled from the intake system in a manner that allows intake manifold pressure to increase without turbocharger surging. Because of this ability to achieve increased intake manifold pressure without accompanying turbocharger surging, the turbocharger is enabled to operate at or near its performance limit, even during low-speed engine operation, and in addition, the basic construction of the turbocharger, which is typically designed with high speed, rather than low speed, operation in mind, does not have to be modified or altered in order to implement principles of the present invention in an engine. Association of a bleed valve with the engine intake system to bleed compressed charge air from the intake system is sufficient, possibly with an additional sensor or sensors, and incorporation of an appropriate algorithm in the engine control processor.

A primary aspect of the present invention relates to a novel strategy for controlling exhaust valve opening in a turbo-diesel engine that has a variable valve actuation apparatus. When the engine is running at less than peak torque speed, the engine control system causes the exhaust valves to open at a later time during the engine cycle than they would in an engine that has a camshaft operating the exhaust valves. The extent to which the control system retards exhaust valve opening is a function of one or more selected variables, such as engine speed, engine load, boost, brake specific fuel consumption (BSFC), and vehicle acceleration.

One aspect of the present invention relates to a novel strategy for a turbocharged internal combustion engine, especially a turbocharged compression ignition, or diesel, engine that has variable valve actuation. The disclosed strategy is implemented via a processor-based engine control and utilizes data relating to certain engine operating parameters to control the bleed of compressed charge air from the engine intake system. The data is processed according to a software algorithm that is executed by the processor to develop data for a control signal that is applied to an electric-operated bleed valve at the outlet of the compressor of the turbocharger. The controlled bleeding counters any incipient surging of the turbocharger resulting from increasingly retarding the timing of exhaust valve opening and accompanying increased fueling.

One general aspect of the claimed invention relates to an internal combustion engine comprising an intake system through which charge air is delivered to an intake manifold of the engine, including a turbocharger that comprises a compressor operated by exhaust gases from the engine for creating compressed charge air that provides boost in the intake manifold. A bleed for bleeding some of the compressed charge air away from the intake manifold allows the intake manifold pressure to increase without turbocharger compressor surging. A control controls the opening of engine exhaust valves in relation to an engine operating cycle, fueling of the engine in relation to the engine operating cycle, and the bleed. At times, the control increasingly retards exhaust valve opening in relation to the engine operating cycle to cause the turbocharger to increase intake manifold pressure, increases engine fueling in relation to the increased intake manifold pressure, and in response to any incipient surging of the compressor resulting from the effect on engine exhaust gases of such increasingly retarded exhaust valve opening and such increased engine fueling, operates the bleed to counteract such compressor surging.

Another general aspect of the claimed invention relates a method for an engine as just described wherein at times, exhaust valve opening is increasingly retarded in relation to the engine operating cycle to cause the turbocharger to increase intake manifold pressure, engine fueling is increased in relation to the increased intake manifold pressure, and in response to any incipient surging of the compressor resulting from the effect on engine exhaust gases of such increasingly retarded exhaust valve opening and such increased engine fueling, the bleed is operated to counteract such compressor surging.

Further aspects of the claimed invention relate to a software algorithm that is embodied in the engine control processor for accomplishing the method just described.

The foregoing, along with further aspects, features, and advantages of the invention, will be seen in this disclosure of a presently preferred embodiment of the invention depicting the best mode contemplated at this time for carrying out the invention. This specification includes drawings, briefly described below, and contains a detailed description that will make reference to those drawings.

DESCRIPTION OF THE PREFERRED EMBODIMENT

Figure 1:
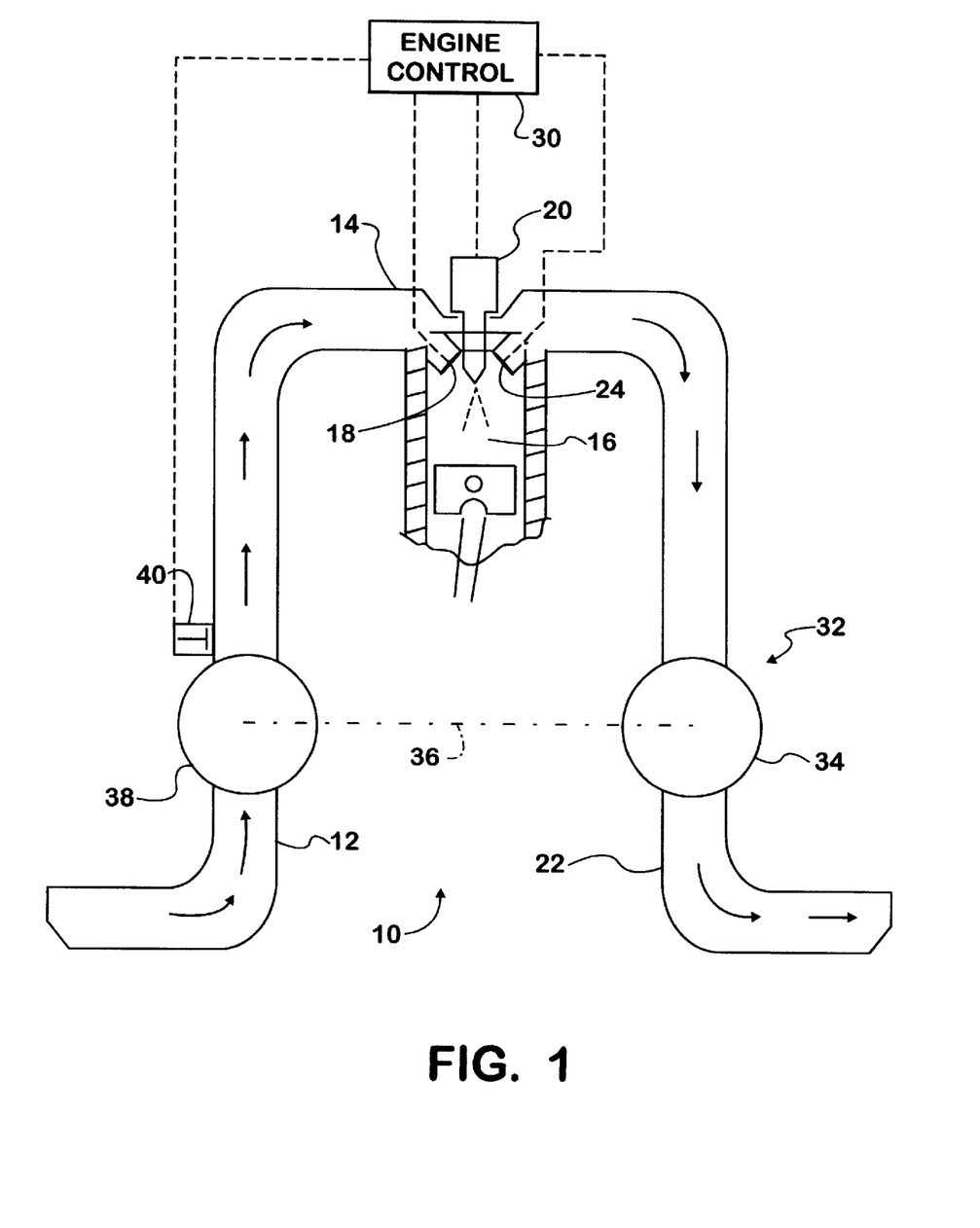
FIG. 1 is a general schematic diagram of an engine, in accordance with principles of the present invention.

FIG. 1 illustrates an internal combustion engine 10 that powers a motor vehicle. An example of such a vehicle is a truck having a chassis containing a powertrain in which engine 10 is a fuel-injected turbocharged diesel engine operatively coupled through a drivetrain to driven wheels for propelling the vehicle. The engine has variable valve actuation that allows the time of exhaust valve opening to be controlled according to engine operation.

Engine 10 comprises an intake system 12 through which charge air is delivered to an intake manifold 14 of engine 10. Charge air enters each engine cylinder 16 from manifold 14 via a corresponding intake valve 18. Individual fuel injectors 20 inject diesel fuel into individual engine cylinders in properly timed relation to engine operation. Engine 10 also comprises an exhaust system 22 for conveyance of exhaust gases created by combustion within the engine cylinders from the engine. Exhaust gases pass out of each cylinder via a respective exhaust valve 24.

Engine 10 may be a camless engine, meaning one where each of the normally closed intake and exhaust valves is opened at the proper time in the engine operating cycle by applying an electric signal to a respective electric actuator.

An electronic engine control 30 that possesses digital processing capability is associated with engine 10. Control 30 may comprise one or more processors that process data from various input data signal sources in accordance with programmed algorithms to develop certain data for signals used in the performance of various functions associated with operation of engine 10. The data processed by control 30 may originate at external sources (input variables) and/or be generated internally of control 30 (local variables). Control 30 develops the data for the signals that operate the intake and exhaust valve actuators and for the signals that operate fuel injectors 20.

Turbocharging of engine 10 is accomplished by a turbocharger 32 which comprises a turbine 34 connected in exhaust system 22 coupled via a shaft 36 to a compressor 38 connected in intake system 12. Compressor 38 is operated by exhaust gases from engine 10 that act on turbine 34 to create compressed charge air that provides boost in intake manifold 14.

A bleed valve 40 comprises an inlet communicated to the compressed charge air in intake system 12. Bleed valve 40 may for example be mounted at the outlet of compressor 38.

Bleed valve 40 comprises an electric actuator that controls the extent to which bleed valve is allowed to open. The actuator is electrically connected with engine control 30. When bleed valve 40 is open, it bleeds compressed charge air out of intake system 12. The extent to which the valve is open determines the extent of bleeding.

Engine control 30 contains a software program that implements an algorithm for control of bleed valve 40, in conjunction with control of engine fuel via fuel injectors 20 and control of exhaust valves 24. That algorithm is presented in FIG. 2 where it is designated by the reference numeral 50.

Figure 2:
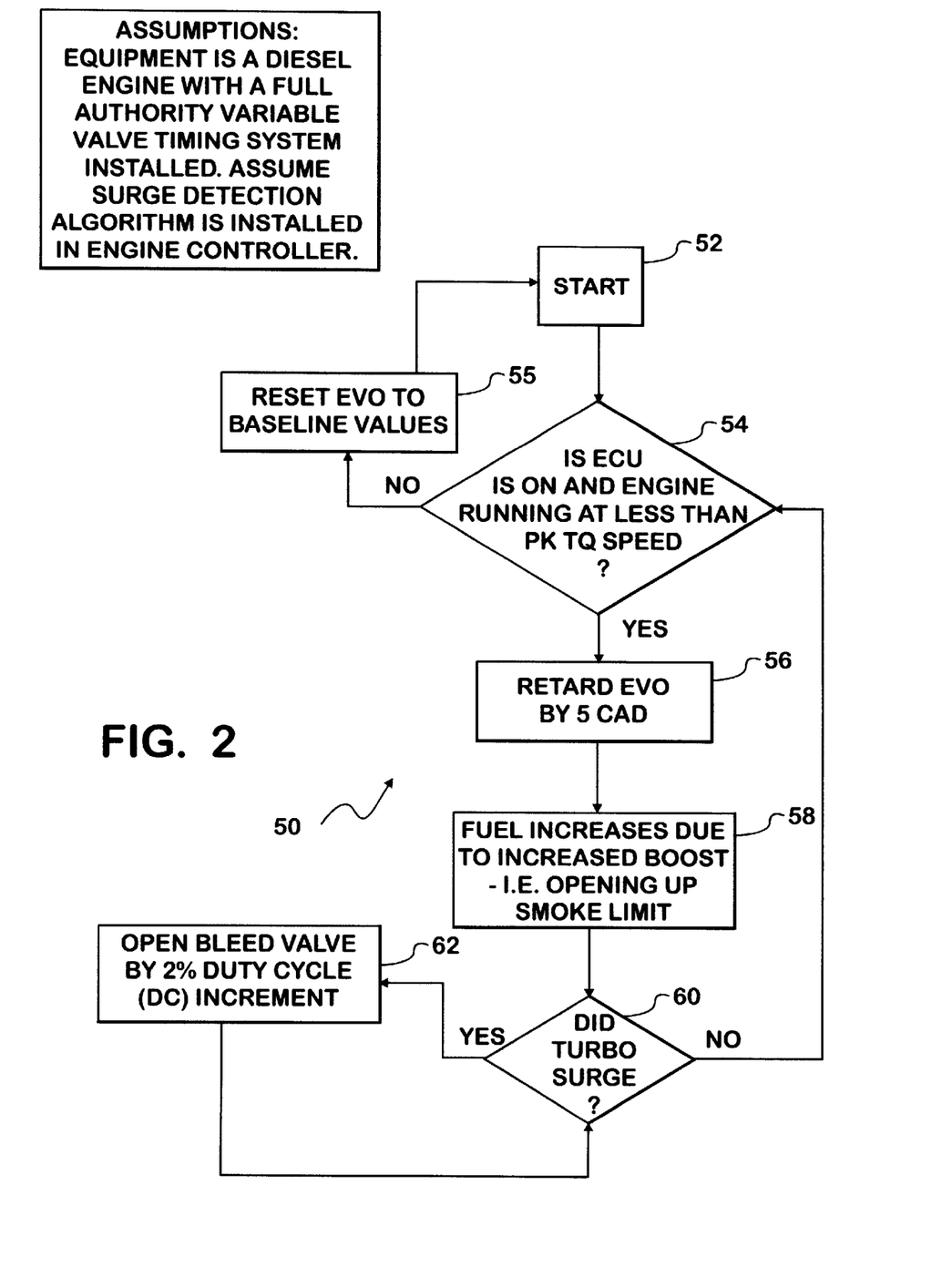
FIG. 2 is a flow diagram of an algorithm used in practicing the invention.

When algorithm 50 is executed, it performs a series of steps designated by the general reference numeral 50, the first of which is a start step 52. Once the start step has concluded and the engine has started, a subsequent step 54 determines a) if the control 30 (ECU) is on, i.e. powered up and running, and b) if the engine is running at a speed less than peak torque speed. If these two conditions a) and b) are not satisfied, then the timing of exhaust valve opening is reset to a baseline value (step 55), after which steps 52 and 54 repeat. When the two conditions a) and b) are satisfied, then step 56 causes the ECU to retard the timing of the opening of exhaust valves 24 in relation to the base line timing value. In the example of algorithm 50, exhaust valve opening is retarded by an additional five degrees of engine crankshaft rotation from the baseline value in the engine cycle.

The next step 58 causes the control to increase engine fueling in accordance with the increased boost resulting from retarding the timing of exhaust valve opening. The increased fueling serves to maintain a desired fuel-air ratio. The next step 60 of algorithm 50 determines if turbocharger 32 began to surge as a result of the delay in opening the exhaust valves. If the turbocharger did not begin to surge, the algorithm loops back to step 54, and if conditions a) and b) continue to be satisfied, steps 56, 58, and 60 repeat. As long as the two conditions a) and b) continue to be satisfied, exhaust valve opening is increasingly delayed by every ensuing iteration of steps 56 and 58.

Eventually however, the retardation will become enough to cause turbocharger surging. Hence, when step 60 determines that turbocharger 32 is beginning to surge, control 30 then begins opening valve 40, as indicated by step 62 of algorithm 50. Valve 40 is initially opened one increment. Step 62 is again performed to determine whether the incipient surging is being counteracted. If not, the algorithm executes step 62 again to cause the valve to open more by applying an additional increment to the control signal for the valve. Step 62 will continually repeat to increasingly open valve 40 until step 60 determines that the incipient surging has been counteracted.

When such a determination has been made, the algorithm returns to step 54.

Figure 3:
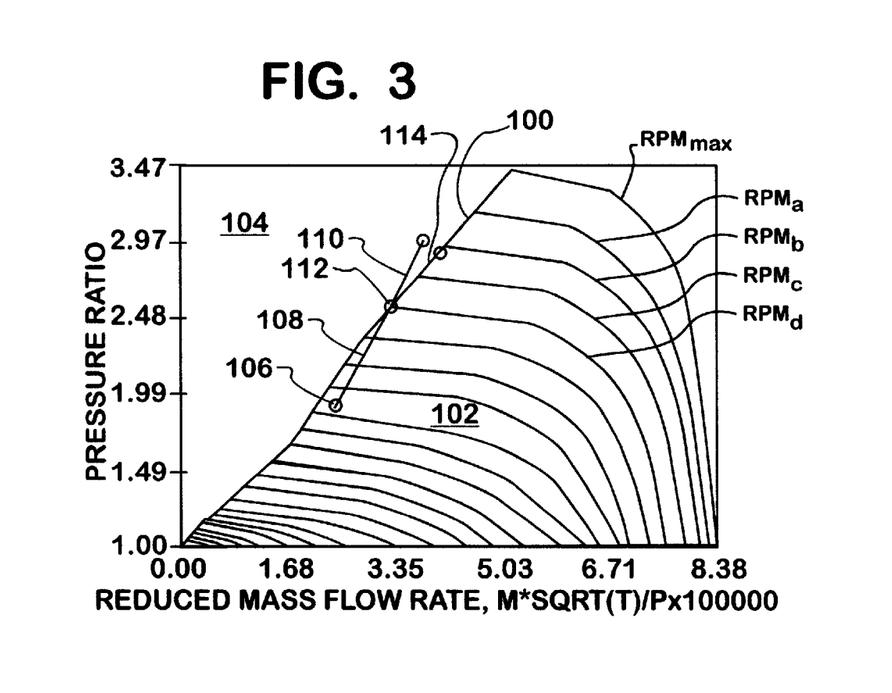
FIGS. 3–11 are various graphs useful in understanding the invention.

FIG. 3 illustrates an example of a compressor speed map for a known turbocharger. A surge line 100 divides a zone of stable turbocharger operation 102 from a zone of unstable operation 104. Within zone 102, known relationships exist between the three parameters presented, namely pressure ratio, reduced mass flow rate, and speed. Let it be assumed that the turbocharger is operating with stability at the operating point marked by the reference numeral 106. If the opening of the exhaust valves is now increasingly delayed or/and engine fueling increased beyond full load fueling, the pressure ratio will increase faster than the air flow which the engine demands. As a result the turbocharger operating point will begin to migrate along a line segment 108 from point 106 toward surge line 100. As the opening of the exhaust valves continues to be increasingly delayed or/and engine fueling continues to be increased, the engine operating point will move along a line segment 110 that crosses the surge line and enters zone 104. The turbocharger will therefore begin to surge as the operating point moves across the surge line at location 112. By bleeding some of the compressed charged air from intake system 12 via bleed valve 40, the operating point can be returned to the stable zone 102, such as along a line segment 114, instead of along line segment 110. In this way, the compressed charge air is bled from the intake system so as to further increase intake manifold pressure without compressor surge. As a result, turbocharger stability is achieved at a pressure ratio and a mass flow rate that are both increased relative to point 112.

Figure 4:
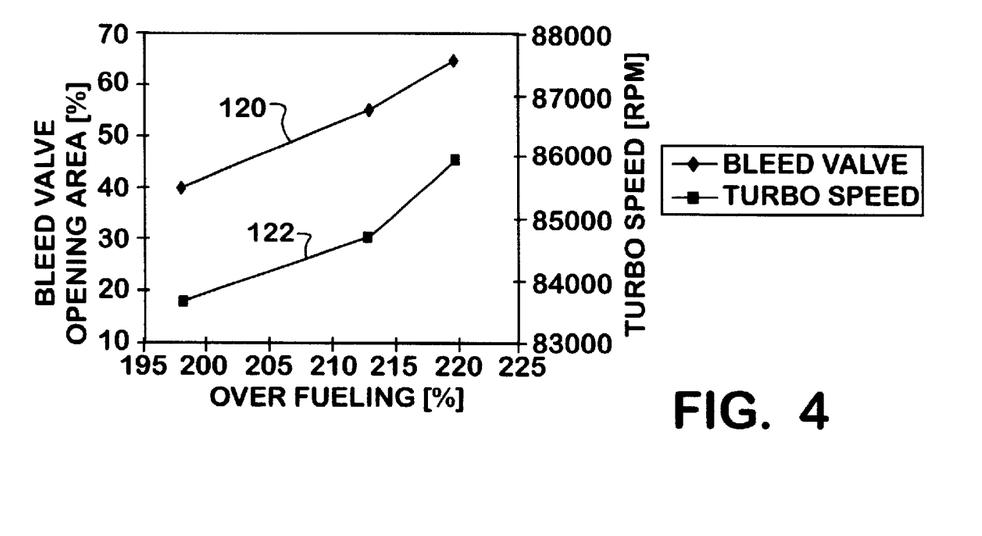

FIG. 4 comprises a plot 120 defining a relationship of the extent of bleed valve opening to the time during the engine cycle at which the exhaust valves begin to open, as measured in degrees of engine crankshaft rotation. It also comprises a second plot 122 defining a relationship of turbocharger speed to the time at which the exhaust valves begin to open. FIG. 4 suggests that as the beginning of exhaust valve opening is increasingly delayed, more compressed charge air needs to be bled through valve 40 in order to prevent turbocharger surging. Plot 120 represents a minimum flow area for bleed, as a function of beginning of exhaust valve opening, that is needed to prevent turbocharger surging. Although retarding exhaust valve opening may result in an engine pumping loss due to compression of gases in a cylinder which is not yet open to exhaust system 22, those gases will have increased effectiveness on turbine 34 when they do enter the exhaust system and pass through the turbocharger toward the tail pipe if the valve opening is delayed sufficiently to allow the pumping out phase to be effective on the exhaust gases.

Figure 5:
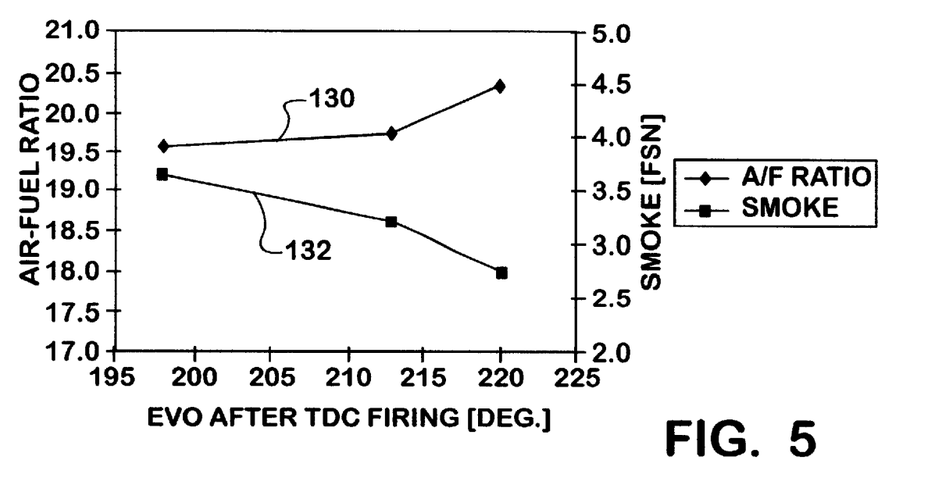

FIG. 5 comprises a plot 130 defining a relationship of air-fuel ratio to the time during the engine cycle at which the exhaust valves begin to open, as measured in degrees of engine crankshaft rotation. It also comprises a second plot 132 defining a relationship of smoke to the time at which the exhaust valves begin to open. FIG. 5 shows that air-fuel ratio increases and smoke decreases in consequence of the increased turbocharger boost created by increasingly retarding the beginning of exhaust valve opening.

Figure 6:
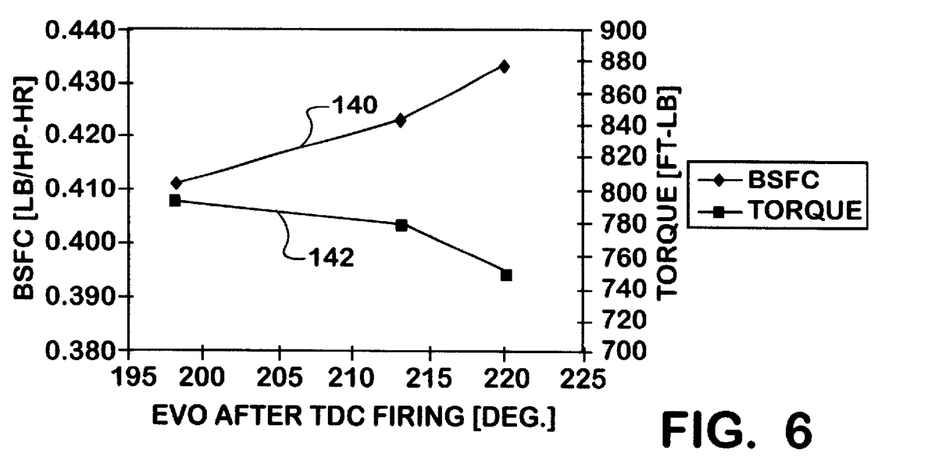

FIG. 6 comprises a plot 140 defining a relationship of brake specific fuel consumption (BSFC) to the time during the engine cycle at which the exhaust valves begin to open, as measured in degrees of engine crankshaft rotation. It also comprises a second plot 142 defining a relationship of engine torque to the time at which the exhaust valves begin to open. FIG. 6 shows that the useful benefits shown by FIG. 5 come at the expense of increased fuel consumption and reduced engine torque occasioned by the increased engine pumping loss.

Figure 7:
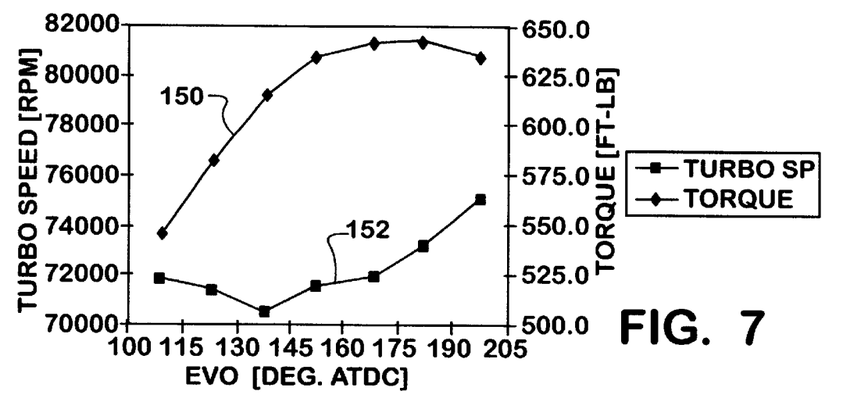
Figure 8:
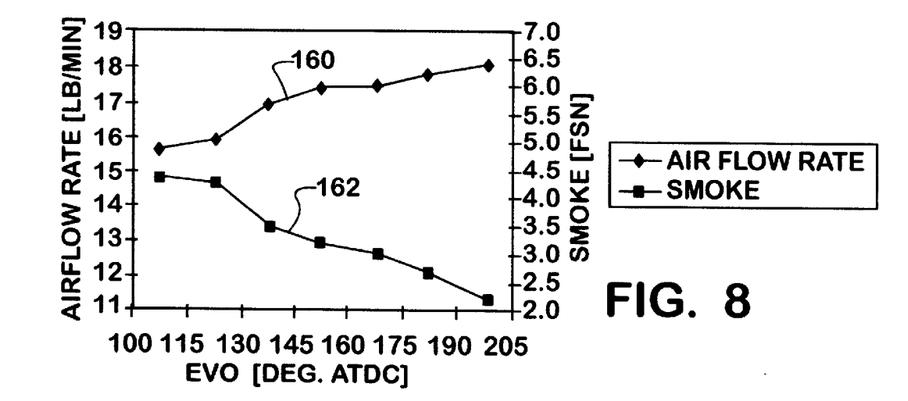
Figure 9:
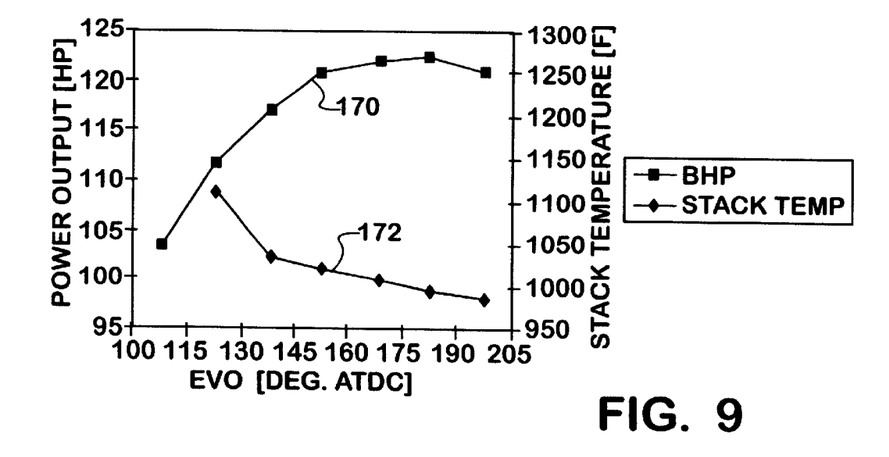

Because of the reduction in smoke however, additional fueling can be introduced into the engine. FIGS. 7, 8, and 9 comprise six plots 150, 152, 160,162, 170, and 172 defining relationships of engine torque, turbocharger speed, air flow rate, smoke, power output, and tailpipe, or exhaust stack, temperature respectively to the time during the engine cycle at which the exhaust valves begin to open, as measured in degrees of engine crankshaft rotation. The relationships are given for the same fixed fueling. They show that retarding the beginning of exhaust valve opening from the baseline (around 135 deg. ATDC in this case) increases the torque up to a point with increase in turbocharger speed. Thereafter, torque tails off slightly as turbocharger speed continues to increase.

At the point where torque begins to increase as a result of the beginning of exhaust valve opening being increasingly retarded, exhaust energy is more efficiently used by the turbocharger, increasing turbocharger speed even more. The resultant increased boost increases the air flow rate. Smoke is reduced because of the lengthened burn-off time inside the cylinder before the exhaust valve opens and a larger air-fuel ratio.

Figure 10:
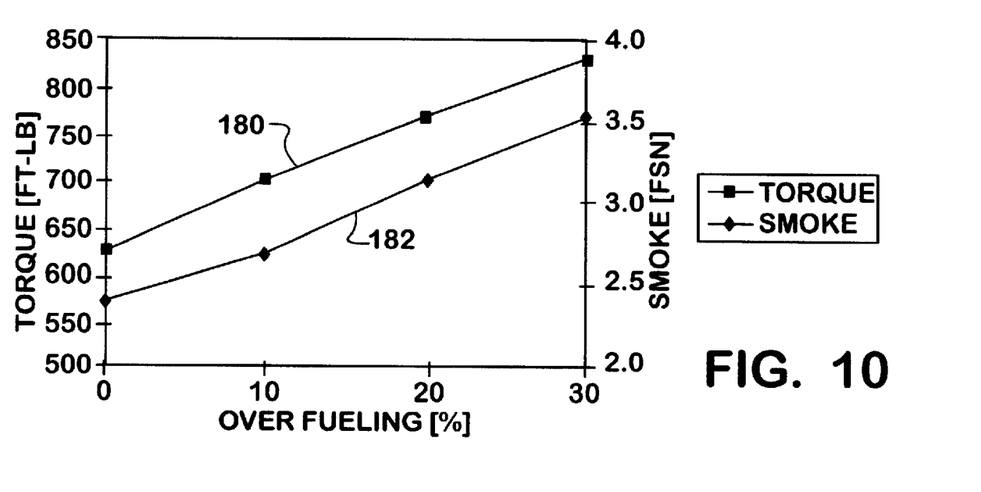

FIG. 10 shows a plot 180 of engine torque as a function of percent over-fueling and a plot 182 of smoke as a function of percent over-fueling at an increased retardation of the beginning of exhaust valve opening. For the same smoke emission as baseline smoke, FIG. 10 shows that 30% more fuel can be added to the engine due to the retardation, resulting in a similar increase in engine torque.

Figure 11:
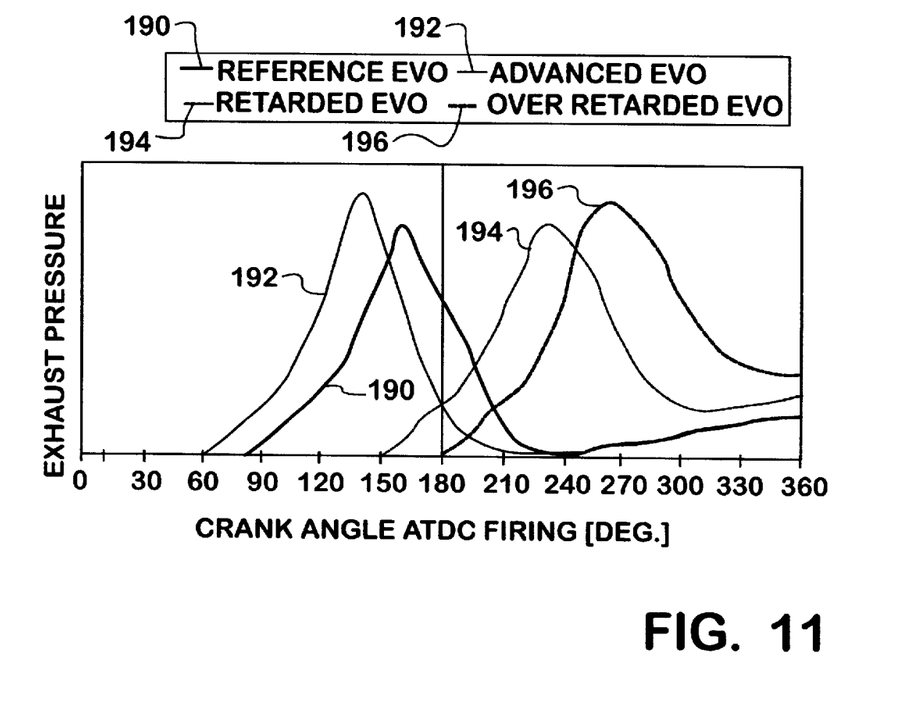

FIG. 11 shows four traces 190, 192, 194, 196 of exhaust pressure versus engine crankshaft angle for four different timings of the beginning of exhaust valve opening. Trace 190 represents exhaust pressure versus engine crankshaft angle for a reference timing. Trace 192 represents exhaust pressure versus engine crankshaft angle for an advanced timing. Trace 194 represents exhaust pressure versus engine crankshaft angle for a retarded timing. Trace 196 represents exhaust pressure versus engine crankshaft angle for an over-retarded timing.

The exhaust process from a cylinder assumes the blow-down and pump-out phases described earlier. When timing is advanced from the reference timing, as shown by comparing trace 192 to trace 190, energy is added to the exhaust gases and thus turbocharger speed increases. Because the energy is added to the rising edge of the exhaust pressure pulse where the pressure is already increasing, the energy use is of lower efficiency to the turbocharger. Energy is taken from the engine and thus engine torque is reduced.

When timing is retarded from the reference timing, as shown by comparing trace 194 to trace 190, a smoother transition appears in the exhaust pressure from the blow-down phase to the pump-out phase. To the turbocharger, this means more efficient use of exhaust energy. In addition, because the retarded beginning of the exhaust valve opening delays the blow-down into the exhaust stroke, the upstroking piston in the engine cylinder slows down the pressure drop in the blow-down period. For the engine, this means additional pumping loss as the piston works against a higher gas pressure. Nevertheless, the gain in expansion work outweighs the pumping loss so that torque output increases and eventually reaches a peak which indicates an optimized beginning of exhaust valve opening for maximum torque output with minimum BSFC. For the turbine, this means additional energy, leading to increased turbocharger speed, boost pressure, and intake flow rate as shown by FIGS. 7–9. As energy is added to the falling the edge of the pressure pulse, the energy use is of high efficiency to the turbocharger.

When timing is over-retarded relative the reference timing, as shown by comparing trace 196 to trace 190, pumping loss outweighs the gain in work and engine torque begins to drop. As turbocharger speed continues to increase, so does the intake air flow rate. This is because the pumping loss to the engine becomes energy added to the exhaust, reflected as a widened and taller exhaust pressure pulse in trace 196. Because of smoke limiting at low engine speeds due to insufficient intake air mass, over-retarding the beginning of exhaust valve opening may provide more air and thus permit more over-fueling for torque improvement. In other words, there is a potential for torque improvement by over-retarding, but such torque gain may be accompanied by an increase in BSFC, when compared to optimized retardation for maximizing torque while minimizing BSFC, as discussed above.

While a presently preferred embodiment of the invention has been illustrated and described, it should be appreciated that principles of the invention are applicable to all embodiments and uses that fall within the scope of the following claims.

What is claimed is:

1. An internal combustion engine comprising:
   an intake system through which charge air is delivered to an intake manifold of the engine, including a turbocharger that comprises a compressor operated by exhaust gases from the engine for delivering compressed charge air into the intake manifold;
   a bleed for bleeding an amount of the compressed charge air;
   exhaust valves that are normally closed but open to allow the exhaust gases to exit combustion chambers of the engine;
   a control for controlling a timing of the opening of the exhaust valves in relation to an engine operating cycle, for controlling fueling of the engine in relation to the engine operating cycle, and for controlling the bleed;
   wherein when the control increasingly retards exhaust valve opening in relation to the engine operating cycle to cause the turbocharger to increase pressure in the intake manifold, the control increases engine fueling in relation to the increased pressure in the intake manifold, and, in response to an incipient surging of the compressor resulting from such increasingly retarded timing of the exhaust valve opening and such increased engine fueling, operates the bleed to counteract such compressor surging.

2. The internal combustion engine as set forth in claim 1 in which the compressor comprises an outlet through which the compressed charge air is delivered to the intake manifold, and the bleed comprises an electrically controlled valve at the compressor outlet for bleeding the compressed charge air away from delivery to the intake manifold.

3. The internal combustion engine as set forth in claim 1 in which the engine operating cycle comprises a compression ignition operating cycle.

4. The internal combustion engine as set forth in claim 1 in which the control operates according to an algorithm that increases the retarded timing of the exhaust valve opening in the engine operating cycle and that increases engine fueling by an amount if the compressor did not begin to surge in response to the increase in the retarded timing of the exhaust valve opening.

5. The internal combustion engine as set forth in claim 4 in which the algorithm further increases the engine fueling in an even greater amount if the compressor did not begin to surge in response to the previously increased fueling.

6. The internal combustion engine as set forth in claim 5 in which the algorithm operates the bleed to increase the bleeding of the compressed charge air if the compressor began to surge in response to the further increase in the engine fueling.

7. The internal combustion engine as set forth in claim 6 in which the algorithm operates the bleed to increase the bleeding of the compressed charge air until a cessation of the compressor surging that began in response to the further increase in the engine fueling.

8. A method of operating an internal combustion engine that comprises:

an intake system through which charge air is delivered to an intake manifold of the engine, including a turbocharger that comprises a compressor operated by exhaust gases from the engine for delivering compressed charge air into the intake manifold;

a bleed for bleeding an amount of the compressed charge air;

exhaust valves that are normally closed but open to allow the exhaust gases to exit combustion chambers of the engine;

the method comprising:

increasingly retarding a timing of an exhaust valve opening in relation to the engine operating cycle to cause the turbocharger to increase pressure in the intake manifold, increasing engine fueling in relation to the increased pressure in the intake manifold, and, in response to any incipient surging of the compressor resulting from such increasingly retarded timing of the exhaust valve opening and such increased engine fueling, operating the bleed to counteract such compressor surging.

9. The method set forth in claim 8 in which the step of operating the bleed comprises controlling the extent to which an electrically controlled valve at an outlet of the compressor is allowed to open to bleed compressed charge air away from delivery to the intake manifold.

10. The method as set forth in claim 8 in which the engine operating cycle comprises a compression ignition operating cycle, the step of increasingly retarding the timing of the exhaust valve opening in relation to the engine operating cycle to cause the turbocharger to increase pressure in the intake manifold comprises increasing the retarding of exhaust valve in the engine operating cycle, and the step of increasing engine fueling in accordance with the increased pressure in the intake manifold comprises increasing engine fueling by an amount if the compressor did not begin to surge in response to the increased retarding of exhaust valve opening.

11. The method as set forth in claim 10 including the step of further increasing the engine fueling in an even greater amount if the compressor did not begin to surge in response to the previously increased fueling.

12. The method as set forth in claim 11 including the step of operating the bleed to increase the bleeding of the compressed charge air if the compressor began to surge in response to the further increase in the engine fueling.

13. The method as set forth in claim 12 in which the step of operating the bleed to increase the bleeding of the compressed charge air if the compressor began to surge in response to the further increase in the engine fueling comprises operating the bleed to increase the bleeding of the compressed charge air until a cessation of a compressor surging that began in response to the further increase in the engine fueling.

* * * * *